United States Patent
Dyson et al.

(10) Patent No.: US 6,307,890 B1
(45) Date of Patent: Oct. 23, 2001

(54) HIGH DENSITY FM SUBCARRIER MODULATION WITH STANDARDIZED NETWORK LAYER

(75) Inventors: Timothy F. Dyson, San Clemente; Steven J. Davis, Hermosa Beach; Gordon E. Kaiser, San Juan Capistrano, all of CA (US)

(73) Assignee: Cue Corporation, Irvine, CA (US)

( * ) Notice: Subject to any disclaimer, the term of this patent is extended or adjusted under 35 U.S.C. 154(b) by 0 days.

(21) Appl. No.: 09/455,982

(22) Filed: Dec. 6, 1999

(51) Int. Cl.[7] .............................. H04L 23/02; H04L 5/12
(52) U.S. Cl. ............................... 375/265; 714/256
(58) Field of Search ..................... 375/295, 265; 714/792, 755, 756; 370/204, 479

(56) References Cited

U.S. PATENT DOCUMENTS

| | | | |
|---|---|---|---|
| Re. 36,430 | * 12/1999 | Halbert-Lassalle et al. | 370/204 |
| 5,105,442 | * 4/1992 | Wei | 375/262 |
| 5,289,501 | * 2/1994 | Seshadri et al. | 375/286 |
| 5,305,352 | * 4/1994 | Calderbank et al. | 375/261 |
| 5,475,716 | * 12/1995 | Huang | 375/354 |
| 5,825,807 | 10/1998 | Kumar | 375/200 |
| 5,903,598 | 5/1999 | Hunsinger et al. | 375/209 |
| 5,949,796 | 9/1999 | Kumar | 370/529 |
| 5,966,401 | 10/1999 | Kumar | 375/200 |
| 6,088,387 | * 7/2000 | Gelblum et al. | 375/222 |
| 6,151,296 | * 11/2000 | Vijayan et al. | 370/208 |

OTHER PUBLICATIONS

Electronic Industries Alliance, "Data Radio Channel (DARC) System," EIA Standard No.EIA-794 (Jun. 1999).
Proakis, "Digital Communications," pp. 544–597, McGraw–Hill (1983).

* cited by examiner

*Primary Examiner*—Chi Pham
*Assistant Examiner*—Phuong Phu
(74) *Attorney, Agent, or Firm*—Lyon & Lyon LLP

(57) ABSTRACT

The present invention provides a system for multiplexing DARC encoded source channels using an FM subcarrier, wherein the system includes a plurality of channels. Each channel within the plurality of channels is coupled to its own DARC encoded source channel. Within each channel of the system, the DARC encoded source channel is block encoded to produce parity and data bytes. The parity bytes and data bytes are separately trellis code modulated to form a first and second set of complex signals, respectively. A first digital modulator modulates a first set of orthogonal signals using the first set of complex signals. A second digital modulates a second set of orthogonal signals using the second set of complex signals.

12 Claims, 2 Drawing Sheets

HIGH DENSITY FM SUBCARRIER MODULATION WITH STANDARDIZED NETWORK LAYER

This invention pertains generally to the field of data communications and more particularly to an FM subcarrier modulation technique.

BACKGROUND OF THE INVENTION

FM subcarrier technology has been used in a number of applications, using a variety of analog and digital communication schemes. For example, Muzak, the familiar "elevator" music piped into physicians' offices, elevators and the like, uses a double side band AM modulation of a 67 KHz subcarrier to carry subscription music.

In another FM subcarrier application, known in Europe as the Radio Data System (RDS) and in the U.S. as the Radio Broadcast Data Service (RDBS), a 57 KHz subcarrier is modulated using bi-polar phase shift keying to carry a low speed (1187.5 bps) digital data signal. This technique incorporates a unique block and bit synchronization method as well as a simple linear block encoding for error detection and correction. RDS is a very robust digital subcarrier communication scheme because of its long baud interval (~1 ms), low subcarrier frequency, and narrow bandwidth. This technology was originally invented and perfected by the Swedish Telecommunications Office and later extended in the rest of Europe. It has been adopted as an international standard and incorporates specification of the physical layer (the modulation and FM interface), the data link layer (error correction coding), and a network layer for service delivery. The channel modulation efficiency of RDS is about 0.3 bps/Hz.

Because of the low data rate of RDS, another format known as the Data Radio Channel (DARC) was invented by NHK in Japan to support a higher data rate FM subcarrier service. DARC is encapsulated into international standards (cf., EIA-794) as having four modes of operation at the physical level. The differences among these four modes involve the amount of error correction coding (ECC) overhead applied to the data transmission. At the physical layer, DARC is 16K bits per second minimum-shift keyed modulation of a 76K Hz subcarrier tone. DARC specifies all of the first four layers of the communications methodology: Physical, Data Link, Network, and the Transport layers.

Of the four modes of operation, the Frame B mode of DARC provides the best channel coding and error correction ability at the cost of reduced data payload rate. The net data rate, after application of layer 2 and layer 3 overhead, is 6,210 bits per second (bps). DARC offers a channel bit rate efficiency of about 0.66 bps/Hz, the typical value for a minimum-shift keyed modulation. This level of efficiency drops considerably after application of ECC.

Because of DARC's relatively high data rate, it has achieved use worldwide. Several IC manufacturers now deliver highly integrated decoders for receiver/demodulation design. Among the countries actively utilizing DARC systems are Sweden, Germany, Austria, France, Hungary, Japan, and the USA.

Offering comparable performance to DARC is the Subcarrier Traffic Information Channel (STIC) developed by the Mitre Corporation under funding from the Department of Transportation, Federal Highway Administration. This digital system uses a differentially encoded, quadrature phase-shift keyed modulation of either a 72.2K Hz of a 87.4K Hz subcarrier tone to deliver a 18,050 or 21,850 bps raw data rate. STIC also has a US standard (EIA-795) but is little known beyond the USA and has seen virtually no commercial use. Like the above systems, the STIC standard addresses layers 1 through 4 of the communications hierarchy. STIC is notable because it applies modern modem technology to a FM subcarrier system by using efficient convolutional coding, code concatenation and interleaving at the bit level to address channel impairments. The overall efficiency of STIC is on the order of 1.15 bps/Hz at the channel bit rate and a net of about 0.6 bps/Hz. Neither figure represents a very aggressive design. However, STIC was reported to be slightly superior to DARC in terms of overall performance in tests conducted in the USA by the Electronics Industry Association (EIA).

Several other "high-speed" subcarrier technologies have been developed over the past 10 years in the United States. Some of the more notable attempts are Seiko's 19K baud (8K bps nominal), SCA Data System's 32K bps proprietary system, Data Broadcasting Corporation's 19.2K bps FSK system, and Command Audio's proprietary DQPSK system, which is very similar to STIC in concept and structure. Command Audio has a portable subscriber unit, manufactured under license by Thompson Electronics, RCA Consumer Products Division, in commercial trials in Denver and Phoenix at the current time. Again, this system barely reaches a 2 bps/Hz efficiency. By contrast, telephone modem technology operates at 7 bps/Hz almost universally throughout the world, illustrating the difficulty of the propagation environment to which FM subcarrier systems are subjected and the rather low efficiency of the current FM subcarrier systems.

Thus, there is a need in the art for FM subcarrier systems that can achieve higher efficiency and data rates yet utilize the established equipment infrastructure built up by current FM subcarrier standards.

SUMMARY OF THE INVENTION

The present invention provides a higher efficiency and data rate system by providing an FM subcarrier system having a plurality of channels. In accordance with one aspect of the invention, each channel within the plurality of channels has an input to couple to its own DARC-encoded source. Within each channel, a systematic block encoder couples to the input and forms data bits and parity bits. A first trellis code modulator modulates the parity bits to form a first set of complex signals. A second trellis code modulator modulates the data bits to form a second set of complex signals. A first digital modulator modulates a first set of orthogonal signals using the first set of complex signals. A second digital modulator modulates a second set of orthogonal signals using the second set of complex signals. The first and second set of orthogonal signals are selected from a set of mutually orthogonal spread spectrum signals.

In one embodiment, each complex signal within the first set of complex signals modulates a pair of orthogonal signals from the first set of orthogonal signals, wherein one signal from the pair of orthogonal signals is modulated by the in-phase component of the complex signal and the remaining signal is modulated by the quadrature-phase component of the complex signal. Similarly, each complex signal within the second set of complex signals modulates a pair of orthogonal signals from the second set of orthogonal signals, wherein one signal from the pair of orthogonal signals is modulated by the in-phase component of the complex signal and the remaining signal is modulated by the quadrature-phase component of the complex signal.

In accordance with another aspect of the invention, a method of transmitting a DARC-encoded sources is provided, the source providing DARC blocks comprising 22 information bytes and 14 CRC bits. The method comprises adding two bits to the DARC block to form a modified DARC block having 24 bytes. The modified DARC block is encoded with a block encoder to produce parity bytes and data bytes. The parity bytes are encoded with a first trellis code modulator to produce a first set of complex signals. Similarly, the data bytes are encoded with a second trellis code modulator to produce a second set of complex signals. A first set of orthogonal signals is modulated by the first set of complex signals. A second set of orthogonal signals is modulated by the second set of complex signals. Each set of orthogonal signals is selected from a set of mutually orthogonal spread spectrum signals.

Other aspects and features of the invention are disclosed by the following figures and description.

DESCRIPTION OF FIGURES

The various aspects and features of the present invention may be better understood by examining the following figures.

DETAILED DESCRIPTION

Figure 1A:
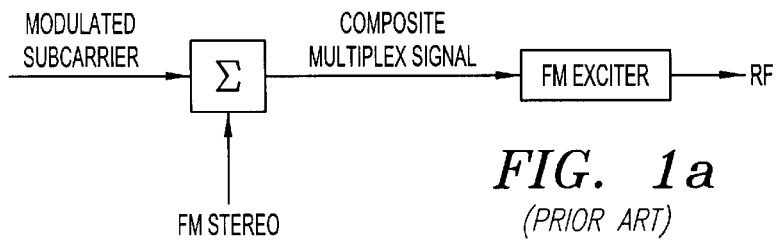
FIG. 1a is a block diagram of an FM subcarrier modulated system.
Figure 1B:
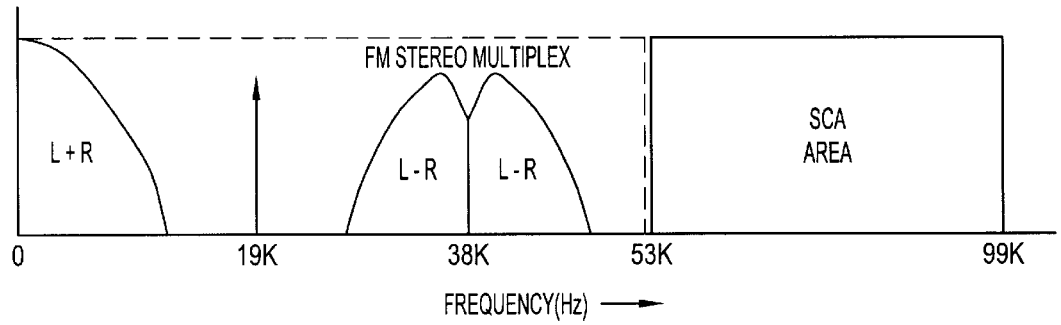
FIG. 1b illustrates the baseband spectrum for an FM stereo signal and the bandwidth available for a modulated subcarrier.

As illustrated in FIG. 1a, in an FM subcarrier system, a modulated subcarrier is linearly combined with an FM stereo signal to form a composite multiplex signal. Because this signal has not yet been used to FM modulate a carrier, it is still at baseband (0 to 100 KHz). FIG. 1b illustrates the spectrum of the baseband FM stereo signal. This stereo signal comprises a left (L) and a right (R) audio signal forming L+R and a L−R sidebands as well as a phase reference tone at 19K Hz. As can be seen from this spectrum, all of the baseband FM stereo signal exists below 53K Hz. However, each "station" on the FM dial is separated by 200K Hz. Based on the well-known bandwidth of FM broadcasting, a full 100 KHz of baseband information may be transmitted. As can be seen from FIG. 1b, the spectrum remaining after inclusion of the FM stereo signal is available to carry additional information. The FCC regulates the spectral mask and injection level restrictions of modulated subcarrier signals that may occupy this sideband area.

The resulting composite multiplex signal, having an FM stereo signal existing below 53K Hz and a modulated subcarrier between 53K Hz and 99K Hz, is used within the FM exciter to produce the familiar FM radio signals available to the public. For example, the FM exciter could translate this composite signal (transformed by FM modulation) to 89.3 M Hz. This signal would be at 89.3 on the FM dial. A listener having an ordinary FM radio receiver tuned to 89.3 would only hear the FM stereo signal used by the commercial station—the FM reception would be unaffected by the modulated subcarrier due to the design of the FM radio receiver. However, a user having a receiver configured to demodulate the subcarrier would receive whatever information has been carried in the sideband channel.

As discussed earlier, a number of formats have been developed to exploit the available sideband bandwidth, including DARC. The data payload in DARC is organized around a block comprising 22 information bytes (176 bits). These information bytes are preceded by a two byte header and followed by 14 cyclic redundancy check (CRC) bits. 272 of these blocks are arranged into a frame. As given by the EIA-794 standard, in Format B of DARC, 190 of these blocks are payload while the remaining 82 are used for ECC. Because a DARC frame requires 4.896 seconds of transmission time, the net DARC "B" data rate is 6210 bps.

The present invention provides a mapping of this fundamental level 3 (network level), and higher, structure of data and CRC bits onto a plurality of orthogonal spread spectrum carriers to effect efficient higher speed communication. In the invention, before these "payload" bits are mapped onto the orthogonal carriers, the data and CRC bits are block encoded, producing block-encoded data and CRC bits and parity bits. The resulting parity bits are themselves separately mapped onto their own orthogonal carriers, wherein the transmitted parity bits have a bit error probability rate lower than that of the transmitted data and CRC bits. For convenience, the set of the information bits and the CRC bits are referred to hereinafter as the data bits. As will be explained, in one embodiment, the mapping of the present invention requires 13 orthogonal carrier pairs (I and Q) to carry the data and parity bits. Because of the unique architecture of the present invention, multiple DARC encoded channels may be multiplexed and transmitted simultaneously.

Figure 2:
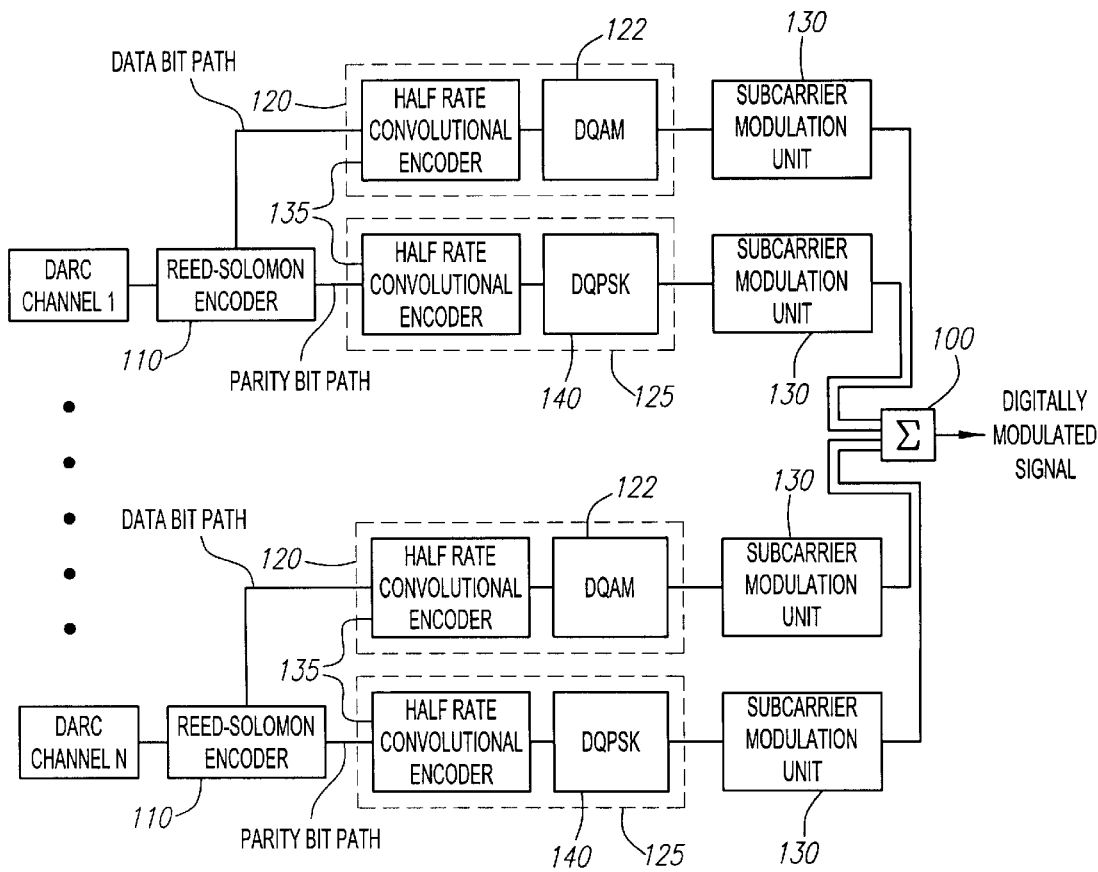
FIG. 2 illustrates a multiplexing architecture for forming a digitally modulated signal according to one embodiment of the invention.

The multiplex architecture of the present invention is illustrated in FIG. 2. A number N of level 3 DARC channels (for illustrations purposes, only channels 1 and N are shown) are used to modulate a plurality of orthogonal spread spectrum signals that are summed at an adder 100 to produce a digitally modulated subcarrier signal. This digital signal is converted to an analog signal and mixed with a subcarrier tone to produce a modulated subcarrier signal that may then be combined with an FM stereo signal as shown in FIG. 1a to form the composite multiplex signal used as an input to the FM exciter. Within each DARC channel, a Reed-Solomon encoder 110 encodes the DARC information bits to produce parity bits that are separated from the information bits. Although a Reed-Solomon encoder is shown, those of ordinary skill in the art will appreciate that other forms of systematic block encoders could be used such as a BCH encoder. After further encoding that will be described herein, the information bits are modulated within a trellis code modulator 120 using a 16-differential quadrature amplitude modulator (DQAM) 122. Similarly, the parity bits are modulated within a trellis code modulator 125 using a differential quadrature phase shift keyed modulator (DQPSK) 140. In one embodiment, the coding within the trellis code modulators 120 and 125 is accomplished using half-rate convolutional encoders (for example, k=7) 135.

Because the outputs of the modulators 120 and 125 are effectively complex symbols each having an in phase (I) and quadrature phase (Q) component, the mapping of these symbols can be made to a pair of orthogonal signals within the subcarrier modulation units 130. One orthogonal signal within the pair is modulated by the I component; the remaining orthogonal signal within the pair is modulated by the Q component. Such modulation may be either amplitude or phase modulation or a combination of both amplitude and phase modulation. The spread spectrum orthogonal signals used within the plurality of subcarrier modulation units are all mutually orthogonal. Thus the resulting multiplex design is scalable, the number N of DARC channels within the multiplex being arbitrary up to performance limitations for quality of service.

Although the number N is arbitrary, the cross correlation effects from one orthogonal signal to another is finite, because these signals are not truly orthogonal, but rather are quasi-orthogonal. In one embodiment, the orthogonal signal may be biorthogonal signals as described in U.S. Pat. No. 5,949,796, which is herein incorporated by reference, wherein suitable spread spectrum orthogonal signals may be generated using PN codes, Gold codes, Kasami codes, Bent codes and other spreading codes known in the art. Further discussion of suitable spread spectrum signals is given by Proakis, *Digital Communications,* McGraw-Hill, 1983, pp. 544–597. As is known in the art, after choice of a spreading code, and generation of a number of pseudo-random sequences, the matrix of resulting vectors (or sequences) may undergo a singular value decomposition (SVD), a Graham-Schmidt orthogonalization, or any other suitable orthogonalization procedure to generate an orthogonal basis set. From this orthogonal basis set, a selection of a subset is made based upon desirable auto and cross-correlation properties of this subset as described in U.S. Pat. No. 5,903,598, which is hereby incorporated by reference. Finally, each orthogonal signal may be altered using digital filtering techniques such that each orthogonal signal has a proper spectral fit with the available sidecarrier bandwidth. As used herein, "orthogonal signal" will refer to orthogonal spread spectrum signals that have been chosen for their advantageous auto- and cross-correlation properties.

The following example will better illustrate the mapping of the information bits to the orthogonal carrier pairs. In a DARC channel, for example, such as channel 1 in FIG. 2, the information bits are in a 22 byte block followed by 14 CRC bits. It is convenient (to preserve an integral byte structure) to add two bits to the CRC bits, thus carrying the CRC bits within two bytes so as to preserve the CRC polynomial as specified in EIA-794 and remain wholly compatible with DARC protocol. The additional bits may be used to carry status information such as a priority level of the DARC channel presently being encoded. After the addition of these two check bits, the 22 byte information block plus the 14 CRC bits becomes an even 24 bytes (or 192 bits).

These 24 bytes could be directly encoded by a Reed-Solomon (24, 26) encoder. Such an encoder would encode the 24 bytes into a 26 byte word. However, to more effectively map DARC level 3 to the physical modulation, it is more efficient to encode two blocks of these 24 byte blocks into a 50 byte word using a Reed-Solomon (48, 50) encoder. The 50 byte word comprises 48 encoded data bytes and 2 parity bytes. Because a Reed-Solomon encoder is systematic, the parity bytes are separable from the encoded data bits. The present invention uses this property to transmit the two parity bytes on a separate channel wherein this separate channel has a lower bit probability error rate than the error rate in the data channel path. After the Reed-Solomon encoding, both the data and the parity bit channels are convolutionally encoded in a half rate (for example, k=7) convolutional encoder 135. Such an encoder outputs 2 bits for every 1 bit input signal. Thus, the byte rate in the data channel will double to be 96 bytes per every double "DARC" block input of 48 bytes (including the 4 extra check bits added to preserve an integral byte structure). Similarly, the parity bytes are doubled after passing though the convolutional encoder 135 in the parity bit path to become 4 bytes.

Figure 3:
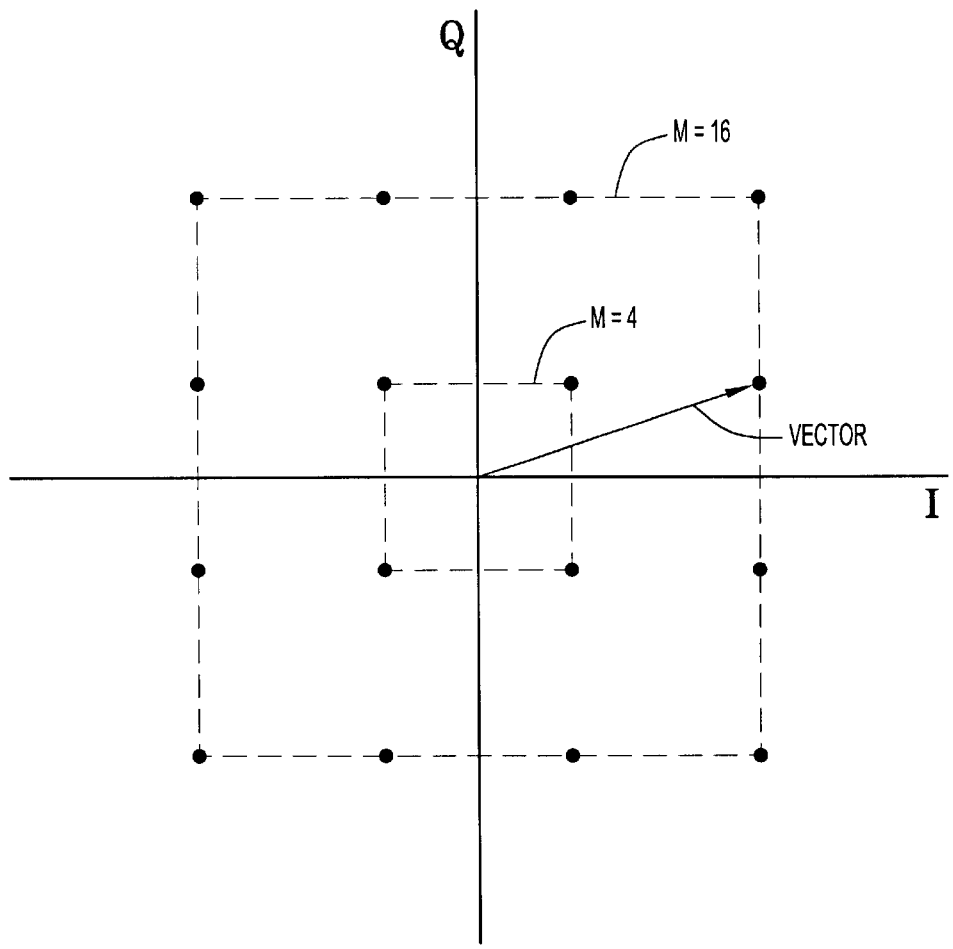
FIG. 3 illustrates a signal space diagram for M=16 and M=4 quadrature amplitude modulation.

The 96 bytes in the data path are then processed by the trellis code mapping within trellis code modulator 120 using a 4 bit differential quadrature amplitude modulation to become 192 complex symbols. Trellis code modulation is preferred because of its efficiency—an important characteristic in an FM subcarrier system which is subject to the bandwidth constraints illustrated in FIG. 1*b*. FIG. 3 illustrates the 16 possible signal points that groups of 4 bits are mapped to in the 4 bit differential quadrature amplitude modulator 122. As can be seen from the vector pointing to a possible signal point (or complex symbol), 2 orthogonal signal carriers can be used to carry both the in-phase (I) and the quadrature-phase (Q) information, thus effectively isolating the error exposure of each signal. If the 192 complex symbols were transmitted in one baud interval, 192 pairs of mutually orthogonal signals would be required. At the DARC data rate, it takes 40 milliseconds to generate the 192 complex symbols. Thus, if only one baud interval were used, its length would be 40 milliseconds.

While the choice of a baud interval is somewhat arbitrary, its design is driven by the required bandwidth-time (BT) factor necessary to allow effective reliable reception at the receiver in this multiple access scheme. As discussed herein, the available bandwidth is determined by FCC constraints. A longer baud interval longer increases the effective signal-to-noise ratio of the system. In one embodiment, an optimal baud length was determined to be 2.5 milliseconds, which gives 16 baud intervals in the 40 milliseconds available. Because the 192 complex symbols must be distributed over these 16 baud intervals, that gives 12 as the number of required orthogonal signal pairs. This maps each DARC input channel to an equivalent 9600 bps subchannel within the invention, which preserves the communications speed near the conventional DARC data rate, a desirable feature for backward compatibility.

A similar analysis may be made in the parity bit path. After passing through the half-rate convolutional encoder 135, the two parity bytes becomes four bytes. These bytes are by mapped by a differential quadrature phase shift keyed modulator 140. FIG. 3 illustrates the 4 possible signal points that groups of 2 bits are mapped to in the differential quadrature phase shift keyed modulator 140. Because 2 bits are mapped into 1 complex signal, the four bytes (32 bits) entering the trellis code modulator 125 are mapped onto 16 complex signals (one symbol per baud interval). Because there are 16 baud intervals used during the 40 millisecond period in which these 16 complex signals are generated, the parity bit path requires only 1 pair of orthogonal signals. Thus, in a preferred embodiment, a single DARC channel level 3 block of 22 information bytes and 14 CRC bits is mapped onto 13 orthogonal signal pairs over 16 baud intervals of 2.5 milliseconds each. In addition, the 13$^{th}$ pair of orthogonal signals within the parity byte path may be impressed with a synchronization (PN sequence) keyed to the frame rate of the DARC input, to enable independent symbol and channel synchronization for each DARC equivalent subchannel.

As can be seen from FIG. 2, multiple DARC channels may be transmitted simultaneously using the multiple access modulation scheme just described. In the preferred embodiment, each additional DARC channel requires an additional 13 pairs of orthogonal signal pairs. The number N of DARC channels so multiplexed is only limited by the cross correlation effects introduced by increasing the number of (quasi) orthogonal signal pairs. The inventors have discovered that at least seven DARC channels may be multiplexed and still achieve the same performance (bit error rate) as achieved by standard format B DARC systems. The output from each channel is summed in the adder 100 to form the digitally modulated signal.

The present invention provides a great improvement in bandwidth efficiency as well as capacity over a conventional DARC system. A conventional DARC system, using the B format, has a data rate of approximately 6300 bps. Because DARC has a bandwidth of 24 KHz (76 KHz center +/−12K Hz), its bandwidth efficiency is 6300/24,000, which is approximately 0.26. In contrast, the data rate of a single channel in the preferred embodiment of the present invention is 9600 bps (from 48 data bytes being transmitted over 40 milliseconds). Thus, the total data rate is (9600 bps/channel)*(7 channels)=67.2 Kbps. This results in a bandwidth efficiency of 67.2K/32K, which is approximately 2.2, an increase of nearly 9:1 over the conventional DARC system.

Figure 4:
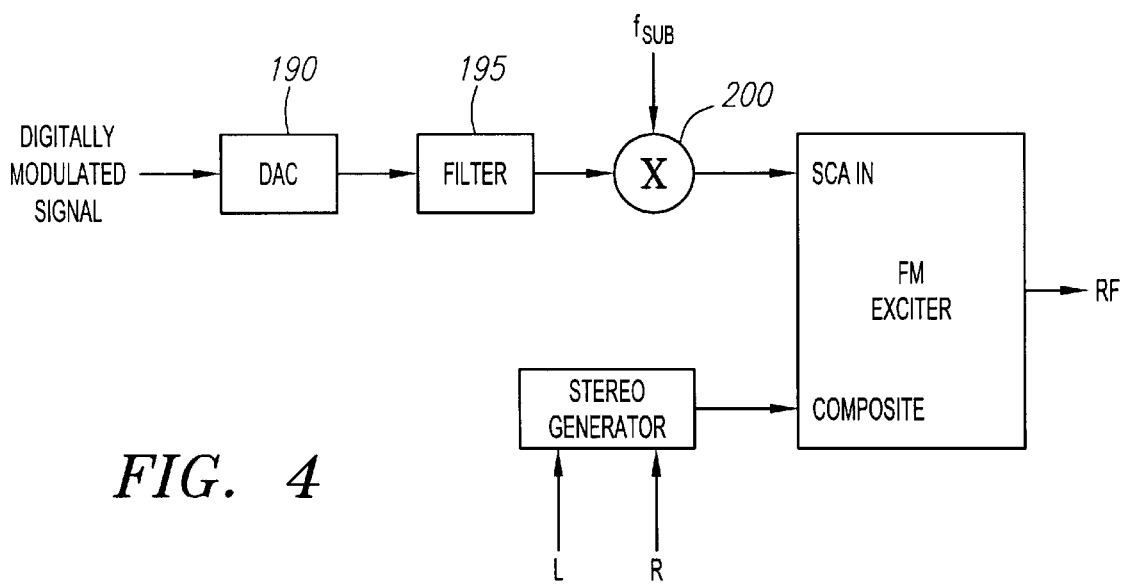
FIG. 4 is a block diagram illustrating the conversion of the digitally modulated signal of FIG. 2 into a composite RF signal.

Further details of the present invention are illustrated in FIG. 4. The digitally modulated signal from the adder 100 (illustrated in FIG. 2) is passed through an digital-to-analog converter 190 and filter 195 and then mixed with the subcarrier tone in mixer 200 to produce the baseband subcarrier signal. As described previously, this signal combines with the FM stereo multiplex signal to form a composite signal that the FM exciter uses as a modulating signal.

Specific examples of the present invention have been shown by way of example in the drawings and are herein described in detail. It is to be understood, however, that the invention is not to be limited to the particular forms disclosed, but to the contrary, the invention is to broadly cover all modifications, equivalents, and alternatives encompassed by the scope of the appended claims.

What is claimed is:

1. A method of transmitting, comprising:
    adding two bits to a block from a Data Radio Channel-encoded source having 190 bits to form a 24 byte modified block;
    encoding the modified block using a systematic block encoder to produce parity bytes and data bytes;
    encoding the parity bytes using a first trellis code modulator to produce a first set of complex signals;
    encoding the data bytes using a second trellis code modulator to produce a second set of complex signals;
    modulating a first set of orthogonal signals using the first set of complex signals; and
    modulating a second set of orthogonal signals using the second set of complex signals, wherein the first and second set of orthogonal signals are selected from a set of mutually orthogonal spread spectrum signals, and wherein a transmitted parity bit has a lower bit error probability than a bit error probability of a transmitted data bit.

2. The method of claim 1, wherein the block comprises 22 information bytes and 14 Cyclic Redundancy Check bits.

3. The method of claim 1, wherein the systematic block encoder is a (50, 48) Reed-Solomon encoder.

4. The method of claim 3, wherein the first trellis code modulator comprises a half rate convolutional encoder coupled to a differential quadrature phase shift keyed modulator.

5. The method of claim 4, wherein the second trellis code modulator comprises a half rate convolutional encoder coupled to a 16-differential quadrature amplitude modulator.

6. The method of claim 5, wherein the modulating the first and second set of orthogonal signals steps occur over 16 baud intervals, the first set of complex signals requiring a single pair of orthogonal signals per baud interval and the second set of complex signals requiring 12 pairs of orthogonal signals per baud interval.

7. The method of claim 6, wherein the baud interval is approximately 2.5 milliseconds.

8. A transmitter having a plurality of channels, wherein each channel comprises:
    an input for receiving a block of bytes from a Data Radio Channel-encoded source;
    a systematic block encoder coupled to the input for encoding the block of bytes, the systematic block encoder having a data byte output and a parity byte output;
    a first trellis code modulator coupled to the parity byte output, the first trellis code modulator mapping the parity bytes into a first set of complex signals;
    a second trellis code modulator coupled to the data byte output, the second trellis code modulator mapping the parity bytes into a second set of complex signals;
    a first digital modulator coupled to the first trellis code modulator, the first digital modulator configured to modulate a first set of orthogonal signals using the first set of complex signals; and
    a second digital modulator coupled to the second trellis code modulator, the second digital modulator configured to modulate a second set of orthogonal signals using the second set of complex signals, wherein the first and second set of orthogonal signals are selected from a set of mutually orthogonal spread spectrum signals, and wherein a transmitted parity bit has a lower bit error probability than a bit error probability of a transmitted data bit.

9. The transmitter of claim 8, wherein the systematic block encoder is a (50, 48) Reed-Solomon encoder.

10. The transmitter of claim 9, wherein the first trellis code modulator comprises a half rate convolutional encoder coupled to a differential quadrature phase shift keyed modulator.

11. The transmitter of claim 10, wherein the second trellis code modulator comprises a half rate convolutional encoder coupled to a 16-differential quadrature amplitude modulator.

12. The transmitter of claim 11, wherein the first digital modulator and second digital modulators are configured to modulate the first and second set of orthogonal signals over 16 baud intervals, the first set of complex signals requiring a single pair of orthogonal signals per baud interval and the second set of complex signals requiring 12 pairs of orthogonal signals per baud interval.

* * * * *